May 19, 1936.  E. R. JONES ET AL  2,040,941
FLUID TREATMENT APPARATUS
Filed Feb. 20, 1933  2 Sheets-Sheet 2

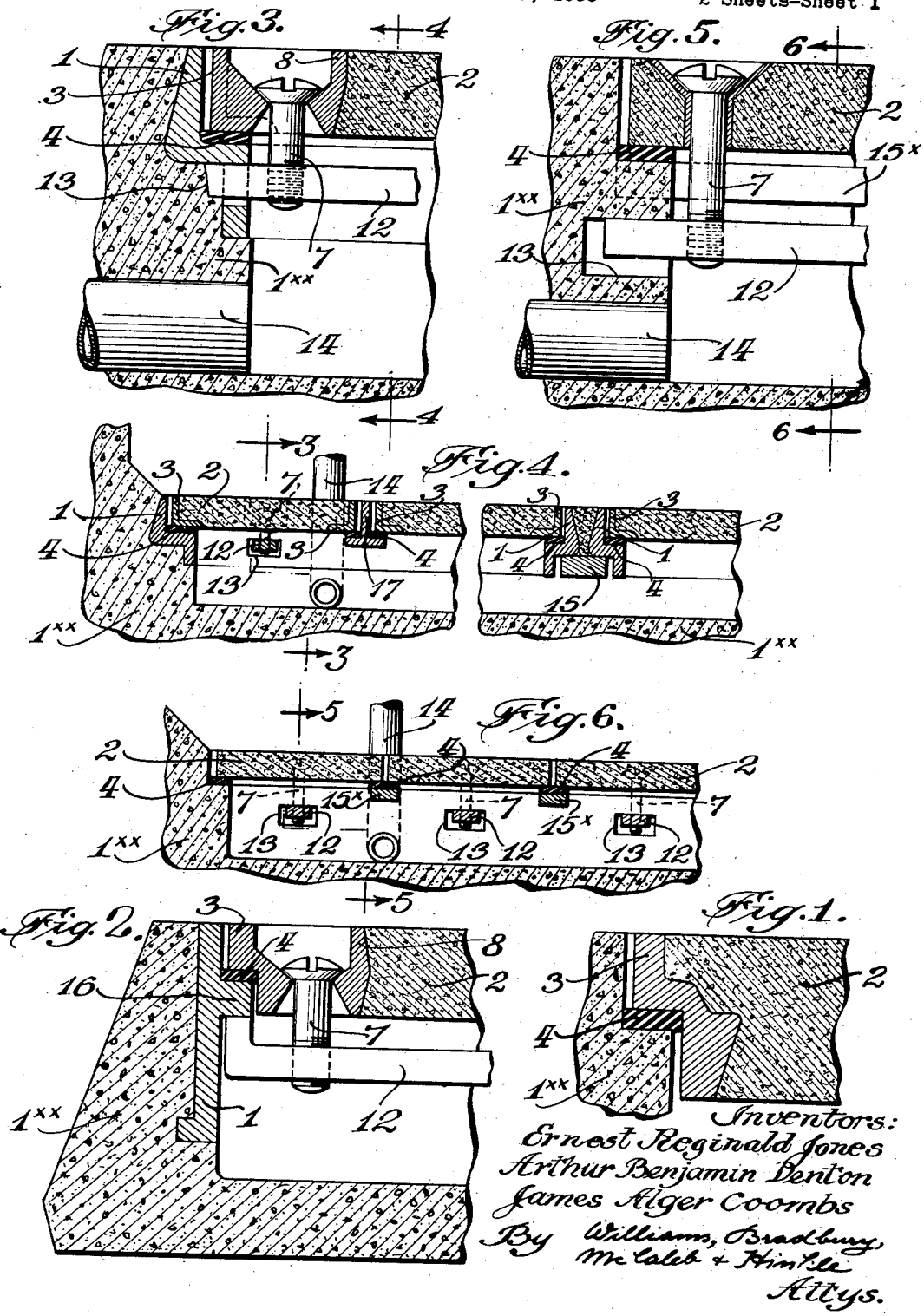

Inventors:
Ernest Reginald Jones
Arthur Benjamin Denton
James Alger Coombs
By Williams, Bradbury,
McCaleb + Hinkle
Attys.

Patented May 19, 1936

2,040,941

UNITED STATES PATENT OFFICE 2,040,941

FLUID TREATMENT APPARATUS

Ernest Reginald Jones, Bromsgrove, Arthur Benjamin Denton, Wollaston, Stourbridge, and James Alger Coombs, London, England, assignors to Activated Sludge Incorporated, Chicago, Ill., a corporation of Delaware Application February 20, 1933, Serial No. 657,690
In Great Britain February 22, 1932

4 Claims. (Cl. 210—8)

This invention relates to fluid treatment apparatus and more particularly to means or apparatus for supplying air or gas in a more or less finely divided state, to fluids.

Such means or apparatus may comprise a porous solid body, such as a porous artificial or natural stone, or perforated plates, held or secured in a metal or other rigid material, body or tray, so that the apparatus is formed into a chamber or plurality of chambers, into which the air or gas under desired pressure is introduced, and is divided up into a large number of more or less small globules or bubbles of air or gas in and by passing through the porous body.

Apparatus of the kind concerned are largely used in systems of sewage purification in which air or gas is supplied to the lower part of sewage treating or purifying tanks.

Apparatus or means of this kind for supplying air or gas in the finely divided state is generally called a "diffuser".

In the following description of the invention the diffuser base in which the porous stone is placed and held, is hereinafter generally termed a "tray", and the porous bodies or stone slabs which are used in it are hereinafter termed "the stone" or "stones".

The term "diffuser" used herein is to be understood as comprising the stones or porous bodies and the trays or parts of the channels or tanks in which they are placed and fixed.

An object of the invention is to provide an improved fluid treatment apparatus.

A further object of the invention is to provide an improved apparatus or means for supplying air or gas in a more or less finely divided state to fluids.

A further object is to provide improvements in connection with means or apparatus of the kind concerned, by which, when desired, the porous bodies or stones can be easily, quickly and inexpensively removed from their tray or body for cleaning or replacement.

A further object is to provide means for holding the porous bodies in such a manner that they can be readily removed as a unit or individually and new porous bodies put in their place.

A further object is to provide a reinforcing means for the porous bodies which will protect them and make their removal easier and without liability of fracture or breakage.

A further object is to provide means which will make it possible to use relatively thin porous bodies to reduce the resistance to the passage of air or gas through the porous bodies.

A further object is to provide means which will take the weight of people working in the treating tanks as they walk upon the porous bodies and so prevent fracture of the porous bodies.

A further object is to provide means enabling the porous bodies to be handled while plastic without danger of their being cracked or broken.

A further object is to provide means for protecting the porous bodies to prevent cracking or breaking of their edges in use or during transit.

A further object is to provide an improved joint between the porous bodies and the bodies in which they are received and held.

A further object is to provide a novel joint making material which forms an improved fluid tight joint.

A further object is to provide a joint making material which forms an air or gas tight joint that can be easily broken when desired without damaging the porous bodies.

A further object is to provide means for relieving the porous bodies of stresses and strains in use and/or resulting from the means holding the porous bodies down.

A further object is to provide improved means for holding the porous bodies in the trays in a readily removable manner.

A further object is to provide frames for the porous bodies of a diffuser.

A further object is to provide an improved fluid tight joint between diffuser stones or their frames and the trays or bodies receiving them by wedging or squeezing a non-rigid joint making material therebetween.

A further object is to provide a simplified diffuser by forming the compressed air or gas chamber or space in the bottom of the fluid treating tank.

Other objects and advantages and the novel features through the provision of which the above mentioned and other advantageous results are attained will be explained with reference to the accompanying drawings in which several embodiments of our invention are shown.

In these drawings:

Figure 1 is a section in detail showing a modified construction of frame for supporting the stones and keying them in position.

Figure 2 is a cross section showing a modification wherein the tray in which the stones and their holding frames are set, is made partly of a metal, for example, a casting 1, and partly of another material, for example, concrete, or the like 1××.

Figure 3 is a transverse section in detail taken on the line 3—3 of Figure 4 showing a modification of the method of holding the stones and frames down in position, wherein the bottom of the liquid treating or aeration channels or tanks, are especially constructed and adapted to receive and hold in position the diffusers.

Figure 4 is a longitudinal section taken on the line 4—4 of Figure 3.

Figure 5 is a transverse section in detail taken on the line 5—5 of Figure 6 showing a further modification or application of the method of holding and forming the air diffusing means of the apparatus.

Figure 6 is a longitudinal section on the line 6—6 of Figure 5.

Figure 7:
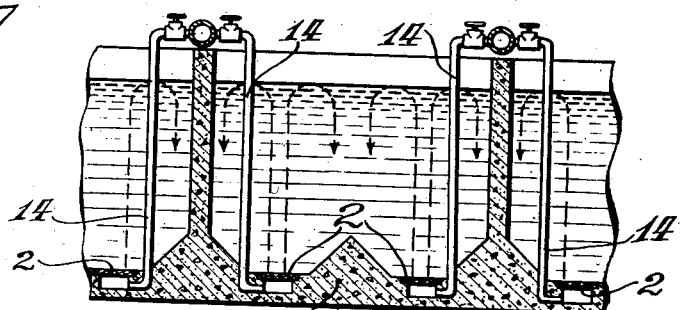
Figure 7 is a section on the line 7—7 of Figure 8 showing a fluid treating tank of the ridge and furrow type.

Referring generally to the drawings, 1 represents the tray of the diffuser, which may be called the body and be a casting; 2 is the porous stone or stones, and 3 is a metal frame in which, in some cases, the porous stone is placed or embedded, and the outer surface of which makes joint by a suitable joint making material 4 with the interior surface of the tray.

The joint making material between these parts may consist of rubber, asbestos, a bitumastic, a plastic or semi-plastic material, or a combination of such materials or other or equivalent materials, which will prevent the escape of air or gas between the surfaces of the tray and the frames or stones, as the case may be. When a plastic joint making material is used, it should be one which does not set hard, and should be one that by supplying certain levering pressure to a frame, or the edge of a stone as the case may be, the joint may be easily broken without the liability of fracturing the stone, so that the frames and the stones within them, or the stones themselves, in the case where there is no frame, can be readily removed from the trays, in situ, and new ones inserted, or the frames or stones replaced.

The joint making material is used between the edges and/or bottom of the edges of the stones, and parts of the upper portion of the tray, which may be formed with seats or supporting parts either of flat, inclined, or other suitable contour or form, so that when the stones are placed down in position and fixed, they will rest or bear on the upper or inner surface of the joint making material, and make the necessary fluid tight joint.

Referring now to the trays 1 themselves, these are in most cases constructed and adapted to receive and hold two or more separate stones, say of unit size, but the space in the trays beneath the frames and their stones, or stones alone, is common, and compressed air is forced into this lower part or common chamber of the tray, and so has access to all the under-surfaces of the stones.

The pressure and holding means for making and maintaining the fluid tight joint is effected in the embodiment illustrated by bolts 7, the lower threaded ends of which screw into threaded holes provided in the bottom of the tray. Where the stones are fitted into frames, for example metal frames, the latter are provided with inwardly projecting lugs 8, having counter sunk conical holes or sockets in them in which the correspondingly tapered or coned heads of the bolts fit; and thus, by screwing down the bolts, the whole frame and its stone are pulled down firmly, so as to make a fluid tight joint with the joint making material 4.

Although bolts are shown, it will be understood that we may employ any other suitable mechanical means for pressing or holding the porous bodies down in position, for example, set pins, studs, cotters, or the like.

Where stones of a strong or hard nature are used, such as those made of carborundum or equivalent material, metal frames are not always necessary. In this embodiment the edges of the stones are given a definite shape, which will correspond generally with the shape of the parts of the tray 1 in which they fit; and the edges make a joint with the joint making material 4.

Instead of the stones being held by two or more bolts or studs at the edges of the stones or their frames, they may be held by the bolts, studs or screws being passed through the stone at a point or at points within their margins or edges.

The porous bodies may be made by filling the frames 3 with the loose material of which the bodies are made. This enables them to be handled while the porous material is still in its plastic state, i. e., immediately after the frames are filled, and without endangering or spoiling the porous bodies by cracking or breaking.

Where the natural stones are used each stone may be fitted, mounted and carried in a metal frame 3, or frame of other suitable rigid material, so that the vertical edges of each stone are enclosed or partly enclosed in and by the frame; and these frames may be made of different forms or sections, such as angle or channel bar section, part of which when the stones in their frames are placed in position in the trays, will contact with the joint making material on the trays.

The frames thus protect the porous bodies or stones, and prevent their edges cracking or breaking; and they reinforce the stones, and reduce the chance of cracking or breaking during packing and transit from factory to final site for use.

As the diffusers are placed in the bottom of the sewage or purifying tanks or channels in which they are used, and are liable to be walked upon, the frames and reinforcing bolts when used, will take the weight, and prevent undue strain being taken by the stones themselves.

These frames 3 can be made of cast metal or from rolled material; and they can be made of any suitable material or metal, but preferably of a metal such as wrought steel or cast iron, which has approximately the same thermal coefficient of expansion as that of the porous stone it protects.

The metal frames add strength to the articles, and thus thinner stones can be used.

If bolts are used, the tension of these can be taken by the frames so that no stresses are carried to the stones.

When set pins are used they may be screwed through inwardly projecting lugs, or the like, on the upper part of the trays, and they act on the upper surfaces or parts of the stones or their frames, and so when screwed down press the same down.

Thus, by screwing and unscrewing these bolts, set pins, studs, or the like, the stones may be pressed down into position and held in the tray, or released or removed therefrom; and when the holding devices are released, the stones may be readily lifted or levered out of position by a suitable tool, without breaking.

In the arrangements shown in Figures 3 to 6, the bottom of the diffuser apparatus into which compressed air is supplied as required, is formed and built in the bottom of the liquid treating tanks so as to constitute the air receiving and supply spaces, and the holding down means in these cases consist of transverse bars 12, into which the bolts 7 screw, the ends of the bars themselves being inserted into holes or recesses 13 formed in the sides of the walls 1×× of the air chambers or spaces, the air being supplied to them by pipes 14 built into the concrete or material of the bottom of the channels or tanks.

The bars 12 are held loosely in position in the holes or recesses 13 and when the bolts 7 are screwed into them, the bars will be pressed against the material forming the roof of the holes or recesses 13. Thus all the parts can be readily placed in position and assembled, and also when required, disassembled or taken apart.

In the modification shown in Figure 2, in which the bar method of holding down the bolts 7 is illustrated, the metal part of the tray marked 1 is provided with an inwardly projecting flange 16 all round as shown, and the ends of the bars 12 for holding the bolts, are pressed against the underside of the flange and the joint making material 4 is pressed by the frames 3 against the upper part of the inwardly projecting flange 16 to make the necessary fluid tight joint.

The modified construction shown in Figures 3 and 4, is similar to that shown in Figure 2, except that the material 1××, for example concrete, forms part of the bottom of the treating tank or channel. It differs further in that a plurality of stones and their frames extend longitudinally along the treating channels or tanks, (see Figure 4) the adjacent end edges longitudinally of the stones 2 on their frames 3 at their ends being supported by the adjacent end members of the metal bottomless trays 1, which rest on transverse bars 15, the ends of which fit into holes in the side of the concrete part 1××; and the spaces between these end members of the tray parts 1 being filled in with cement or concrete as shown in Figure 4.

The bottomless trays 1 as illustrated in Figure 4 may receive and support two or more stones 2 with their frames 3 in line, in which case the inner ends of these stones, which are adjacent to one another, are supported on joint making material 4 carried on the flanges of inverted T shaped transverse cross bars 17, preferably formed integral with the bottomless metal tray parts 1.

Figures 5 and 6 show a further modified construction in which strong and tough artificial stones, such as carborundum or the like are used. In this construnction the metal frames may be omitted and the tray is formed in the bottom of the tank.

The ends of the transverse bars 15× shown in Figure 5, fit into recesses in the cement or concrete 1×× of the air chambers, and they support the joint making material 4 under the adjacent ends of the stones 2 as seen in Figure 6.

A fluid tight joint is made between the bottoms of the ends of the stones and the concrete 1×× by a suitable joint making material 4. A similar joint making material is used along the sides between the bottom of the stones and the cross bars 15×.

Figure 8:
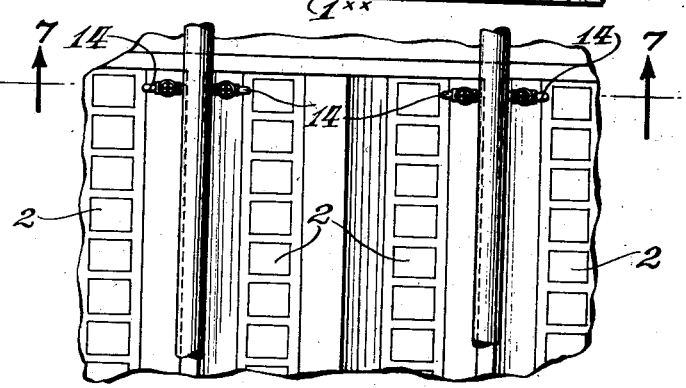
Figure 8 is a top plan view of the tank shown in Figure 7.
Figure 9:
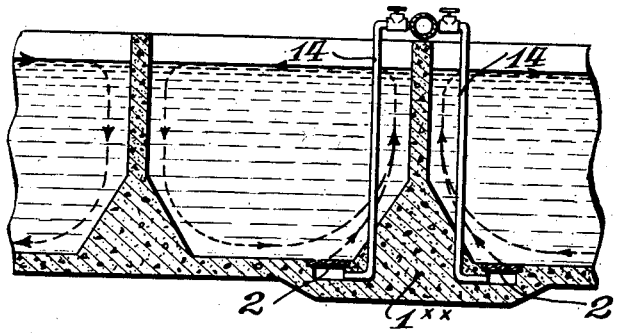
Figure 9 is a section on the line 9—9 of Figure 10 showing a tank construction of the spiral flow form, i. e. there is a circular transverse flow, and a bodily longitudinal flow.
Figure 10:
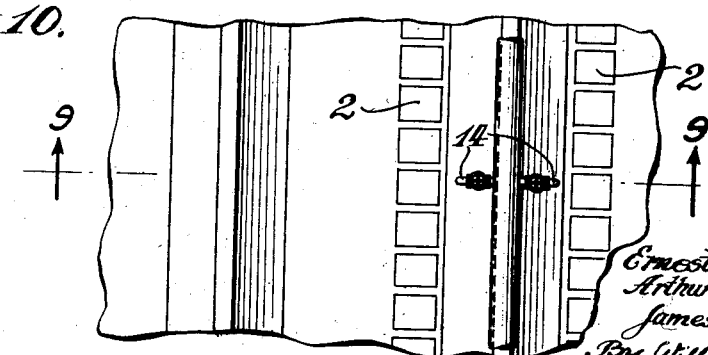
Figure 10 is a top plan view of the tank shown in Figure 9.

Figures 7 to 10 show a construction and arrangement in which the air chamber for the compressed air beneath the stones is formed in the bottom of the treating channels or tanks themselves, air being led to the same by pipes 14 through the concrete of the bottom of the channels or tanks and leading into these air chambers.

With regard to the removal or renewal of diffuser stones, these stones can be removed and renewed with the diffusers in situ in the bottom of the tanks or channels on the tanks or channels being emptied, or the whole diffusers may be removed from the tanks or channels and fresh ones placed in position.

With regard to the method in which the diffusers are lifted out of the sewage treating vessel or tank, to do this readily, the tanks or channels can be emptied and the stones removed without removing the frames or trays; or, again the diffusers can be lifted out while the treating tanks or channels are full, and what is required to be done can be done while they are away from the tank, after which they can be replaced.

While several embodiments of the invention have been described, it is understood that various other embodiments might suggest themselves to anyone skilled in the art. For instance, as a further modification of the manner of arranging and fixing the stones in the frames or trays, the frame may have an inwardly projecting part or shape with grooves or spaces between the inside of the frames and the outside of the ends or sides of the stone, and into these spaces or grooves cement or the like may be inserted so that the stones would be cemented in the frames and a seal joint produced.

Further, with regard to the manner of pressing down the stones, a bar or bars may extend across the upper adjacent ends of the stones, and the latter may be pressed down by means of bolts screwing into a cross bar in the tray below; and in pressing the stones down they will act on a joint making material such as above described, and make the necessary fluid tight joint or seal; and the ends and sides of the stones and cross bars between which the joint making material lies may be inclined.

Or, again, the ends of the stones may rest on packings on flanges of the tray cross bar, and the upper cross bar above referred to, will be adapted to be pressed down by bolts as described, and it will make joint with the upper surface of the ends of the stones.

The invention can be applied to or used in connection with supplying air or gas to any fluid, that is to fluids other than sewage and impure liquids of that kind, and in which the stone or material through which the air is passed must or should be chemically clean, and where the presence of impure organic matter in the stone renders the use of same impossible. Such stones have to be renewed or purified; and in such cases particularly the invention is very advantageous, inasmuch as the stone or stones and their frames can be readily removed and cleaned as by burning, heating, or treating with chemicals and replaced.

While we have illustrated and described in detail various specific embodiments of our invention, we contemplate that other adaptations and changes may be made without departing from the scope or spirit of our invention as defined in the following claims:

We claim:

1. In a fluid treatment plant, tanks adapted to receive the fluid to be treated, air or gas receiving and supplying spaces formed in the bottoms of said fluid treating tanks, porous bodies covering said spaces, sealing means between said porous body and said tanks means such as transverse bars inserted in recesses formed in the side walls of said spaces, and mechanical means associated with said transverse means for holding the porous bodies against sealing means.

2. In a fluid treatment plant, tanks adapted to receive the fluid to be treated, air or gas receiving and supplying spaces formed in the bottoms of said fluid treating tanks, a plurality of bottomless trays carried by the walls of said spaces, a plurality of frames adapted to fit in said trays, porous bodies mounted in said frames, sealing means separating said frames from said trays, means such as transverse bars inserted in recesses formed in the walls of said spaces and means associated with said transverse means for mechanically holding the frames against said sealing means.

3. In an apparatus for supplying a gaseous medium in a finely divided state to liquids, the combination of a reservoir formed with a chamber for said gaseous medium, said chamber having a concrete body portion and a metal seat at the juncture between said chamber and said reservoir, a diffuser adapted to fit on said seat, shoulders formed in the wall of said chamber, a metal bar located in said chamber and engaging said shoulders and threaded members passing through said diffuser and threaded into said bar to secure said diffuser against said seat.

4. In an apparatus for supplying a gaseous medium in a finely divided state to liquids, the combination of a reservoir formed with a chamber for said gaseous medium, said chamber having a concrete body portion and a metal seat at the juncture between said chamber and said reservoir, a diffuser adapted to fit on said seat, shoulders formed in the wall of said chamber, a metal bar located in said chamber and engaging said shoulders threaded members passing through said diffuser and threaded into said bar to secure said diffuser against said seat, and liquid-tight packing means interposed between said diffuser and said seat and compressed to form a liquid-tight joint by means of said threaded members and said bar.

ERNEST REGINALD JONES.
ARTHUR BENJAMIN DENTON.
JAMES ALGER COOMBS.